Patented Nov. 9, 1926.

1,606,343

UNITED STATES PATENT OFFICE.

CHARLES LALOR BURDICK, OF NEW YORK, N. Y., ASSIGNOR TO GUGGENHEIM BROTHERS, OF NEW YORK, N. Y., A COPARTNERSHIP.

METALLURGICAL PROCESS.

No Drawing. Application filed June 7, 1924. Serial No. 718,566.

This invention relates to an improved metallurgical process particularly adapted for the recovery of tin, bismuth, molybdenum and other valuable metals from their ores, concentrates, drosses, scraps, and the like. The invention aims to provide an improved metallurgical process for the concentration and/or recovery of valuable metals which form volatile compounds with sulfur, such as tin, molybedenum and bismuth, from their ores, concentrates, etc.

The invention is particularly applicable to the concentration and/or recovery of tin from tin-bearing ores, and this application of the invention will be herein particularly described. It is to be understood that the same general method of treatment is appropriate for the concentration and/or recovery of tin from other tin-bearing materials, such as concentrates, scrap, drosses, and the like, as well as for the concentration and/or recovery of other metals which form volatile compounds with sulfur. Throughout this specification and the appended claims, I intend the term "ore" to include concentrates, scrap, drosses, and other metal-bearing materials.

I have discovered that under appropriate conditions of temperature and gaseous environment and in the presence of sulfur in appropriate form metals such as tin, bismuth, molybdenum and the like, form volatile sulfur compounds which can be appropriately collected and recovered. The present invention takes advantage of this phenomenon. Accordingly, the improved metallurgical process of the invention comprises, in general, the treatment of tin ore, or the like, at an appropriate elevated temperature with a sulfur-containing gaseous medium such as a gas or a mixture of gases of somewhat or generally reducing character with which is associated sulfur, hydrogen sulfide, or other appropriate form of sulfur. Under proper conditions of gas concentration, there results a rapid and exceptionally complete volatilization and removal of the tin from the ore or other tin-bearing material. Moreover, the reducing character of the gaseous medium is such as to insure stability. That is, it tends to prevent the decomposition of the metallic sulfur compound existing in the ore, or formed by the interaction of the metallic compound in the ore and the sulfur component in the gaseous medium.

The practice of the invention will be illustrated by the following examples: An ore containing 6% of tin (largely in the form of cassiterite) was treated at a temperature of 800° C. with a gas made up of three parts of water vapor and one part of hydrogen sulfide. The ore was confined in an externally heated retort through which the gas was continuously passed in such manner as to secure intimate contact with the ore. At the end of 30 minutes, 87.9% of the tin present in the ore had been volatilized in the form of a tin-sulfur compound and appropriately collected. Treatment of the same ore under the same conditions for 45 minutes gave a recovery of 92% of the tin present in the ore. In another case, treating the same ore at the same temperature, and using a gaseous medium made up of four parts of water vapor to one part of hydrogen sulfide, 84% of the tin in the ore was volatilized as a tin-sulfur compound at the end of thirty minutes and 96% of the tin was similarly volatilized at the end of 45 minutes. In another case, treating the same ore at the same temperature, and using two parts of water vapor to one part of hydrogen sulfide, 44% of the tin in the ore was volatilized in twenty minutes and 78.6% in 30 minutes. In other cases, where the ratios of water vapor to hydrogen sulfide in the gas mixture were 8, 10 and 15, respectively, 91%, 89% and 66%, respectively, of the tin in the ore was volatilized in 45 minutes. In still another case in which the gaseous medium consisted of four parts of nitrogen and one part of hydrogen sulfide, 92% of the tin in the ore was volatilized in 45 minutes.

I have obtained similar results using sulfur vapor and water vapor with or without the presence of a certain proportion of hydrogen. Likewise, good results have been obtained using a mixture of carbon dioxide, carbon monoxide with sulfur or hydrogen sulfide or other appropriate sulfur component with or without the presence of hydrogen.

In general, I have found that the optimum results are obtained when the atmosphere or gaseous medium within the furnace, or other apparatus in which the process is carried out, is not too strongly reducing, and to this end I find it advantageous to mix relatively large quantities of water vapor and carbon dioxide with the sulfur-containing gas or gases. Water vapor and/or carbon dioxide when present in relatively large quantities prevent the reduction of ferric oxide ($Fe_2O_3$) to ferrous oxide (FeO) and ferrous sulfide (FeS). Thus, by employing a gaseous mixture of relatively low reducing power, there is but little or no tendency for the reduction of iron and other less-valuable metal compounds in the ore, or for the formation of an iron-tin matte from which the tin is difficultly volatilized. Moreover, the use of a gaseous mixture containing relatively large quantities of such gases as water vapor and carbon dioxide minimizes the consumption of the sulfur component in the gaseous mixture.

The process of the invention may be divided into stages, namely, first treating the ore under conditions of temperature, gas concentration, sulfur concentration and proportion of reducing agent most favorable for the formation of tin sulfide; second, subjecting the treated ore to the volatilization operation under appropriate conditions of temperature, gas concentration, etc., for accomplishing efficient volatilization.

Any appropriate form of apparatus may be employed in practicing the invention. The ore may be conducted through the reaction and volatilization zone of a furnace on appropriate pans or pallets. Externally heated tubular retorts have given satisfactory results. Such retorts may be intermittently or continuously operated, and may be inclined and rotatable or may be vertically disposed. Suitable means may also be provided for agitating or stirring the ore charge, so as to secure intimate contact between the ore and sulfur-containing gaseous medium, and so as to expose all of the ore to the action of this medium. In some cases, however, it is inadvisable to disturb the ore because of resulting dusting of the ore particles and contamination of the volatilized tin sulfide. In any case it is to be understood the manner of treatment would be appropriately adapted to the particular ore.

The tin-bearing ore is heated to an elevated temperature of about 800° C. and the sulfur-containing gas, preferably diluted with other gases as described, is passed through and in intimate contact with the heated ore.

The sulfur-containing gases may be introduced at one end of the apparatus and the volatile tin-sulfur compound (probably stannous sulfide) removed from the other end of the apparatus and appropriately collected. A sufficient volume of gas should be employed to sweep through the apparatus and effectively carry away all of the volatile tin-sulfur compound. In order to secure this necessary volume of gas, the sulfur-containing gas is preferably diluted with other gases such as water vapor (steam), carbon dioxide, carbon monoxide, nitrogen, and the like.

The improved process of the invention permits the use of relatively large quantities of inert gas in the sulpur containing gas mixture. This use of relatively large quantities of inert gas has no deleterious effect but on the contrary may be, and usually is, of specific advantage. For instance, a gas made from the partial combustion of oil or coke and containing carbon dioxide, water vapor, hydrogen and carbon monoxide, together with the appropriate quantity of sulfur and in addition containing large quantities of nitrogen is very suitable for the practice of the invention because the nitrogen and other inert or diluting gases assist in sweeping out the volatile tin-sulfur compound into the condensing apparatus. By such a use of relatively large quantities of nitrogen savings are effected in the quantities of the more valuable gases that would otherwise have to be passed through the furnace.

Any sulfur-containing gas that will react with the tin-oxide in the ore to form a volatile tin-sulfur compound may be employed as the sulfur component of the gaseous medium. Thus, sulfur vapor (with or without hydrogen), hydrogen sulfide, or carbon bisulfide may be used. Sulfur or sulfides may even be mixed with the tin ore for providing the necessary sulfur to form the tin-sulfur compound, but in this case precautions must be taken to maintain adequate sulfur in association with the ore and at the reaction temperature throughout the entire treatment operation.

It is to be understood that when I mention hydrogen sulfide or carbon bisulfide as the sulfur-containing component of the gas mixture employed in the practice of my invention, I do not necessarily mean that the hydrogen sulfide or carbon bisulfide exists in the undissociated state at the temperatures within the furnace. In describing the gas mixtures employed in practicing my invention, I have described the components thereof in the form in which they exist before being introduced into the furnace.

The formation and volatilization of the tin-sulfur compound is accelerated by an increase in temperature. In the case of one ore the volatilization of one pound of tin from the ore at the specified temperatures was shown to take the following number of cubic feet gas input to the furnace: 800° C. 420 cubic feet of gaseous mixture, 850° C. 130 cubic feet of gaseous mixture, 900° C. 50 cubic feet of gaseous mixture. The economic compromise of temperature is dictated in practice by fusibility of the ore and one works usually, or at least in the first stages of the reaction, at a temperature below that of fusion or sintering of the ore. I have found that there is much less tendency to the sintering of the ores when using appropriate gas mixtures and concentrations as hereinbefore described rather than gases of high reducing power. With gases of high water vapor and carbon dioxide content, the ores remain practically as granular and pulverulent when withdrawn from the furnace as when put in.

A further characteristic of the process of the invention is that by this process of tin sulfide formation the tin in the ore or unvolatilized from the ore is of a much more readily soluble character than the tin in the original ore or the tin in an ore treated with a strongly reducing gaseous agent as, for example, hydrogen. Following the method of my present invention, I have found it possible to reduce the total hydrochloric acid insoluble tin in the ore to as low as 0.06 to 0.09%. Under certain circumstances, therefore, it may result more economically not to carry the volatilization reaction to completion but to rely on leaching methods for the removal of the sulfidized tin from the ore.

Bismuth, molybdenum and other metals may be volatilized in the same manner as hereinbefore described in connection with tin. For example, in treating a Bolivian tin ore assaying 6.0% tin and 1.0% bismuth, 80% of the total bismuth content of the ore was volatilized along with the tin. The form in which the tin, bismuth, molybdenum and other metals volatilize seems to be mainly that of the sulfide. For instance, in one case the material volatilized and condensed, in the practice of the invention, assayed:

| | Per cent. |
|---|---|
| Tin | 61.2 |
| Bismuth | 6.0 |
| Iron | 6.0 |
| Arsenic | 1.0 |
| Sulfur | 16.5 |
| Insoluble | 3.0 |
| Remainder by difference | 6.3 |
| | 100.0 |

Depending somewhat on the gas composition and the method of carrying out the reaction and the condensation, the composition of the condensed material may vary. It is not my intention, therefore, to limit the present invention to the formation and volatilization of tin sulfide and the like, but, on the contrary, the invention in its broad aspect, is directed to the method of producing volatile metallic compounds whatever they may be in the manner herein described.

The volatilized tin-sulfur compound is carried away from the reaction apparatus by the gas current and is condensed in any appropriate manner. The reaction apparatus and condenser may be connected in a substantially closed gaseous circuit, so that the exhaust gases from the condenser are returned to the reaction apparatus. Appropriate amounts of the sulfur-containing component will be added to the exhaust gases to bring the sulfur content thereof to the proper proportion for the effective formation of the tin-sulfur compound in the reaction apparatus.

The tin, or other metal or metals, may be recovered from the condensate in various ways. Stannous sulfide is readily broken up, and the condensed tin-sulfur compound resulting from the practice of my present invention closely resembles stannous sulfide in this respect. The tin-sulfur compound may, for example, be dissolved in sodium hydrate or in sulfuric acid and the tin recovered from the resulting solution by electrodeposition.

The condensed tin-sulfur compound may be dissolved in a fused electrolyte of appropriate composition, for example, fused sodium sulfide. The fused electrolyte is subjected to electrolysis at a temperature at or above the boiling point of sulfur. The tin is deposited on the cathode and sulfur vapor is evolved from the anode. The sulfur vapor is appropriately collected and condensed.

The condensed tin-sulfur compound may be treated by a strong reducing gas, such as hydrogen, carbon monoxide or the like. This treatment, at appropriate temperature, reduces the tin-sulfur compound with the production of metallic tin.

Stannous sulfide when heated to a temperature of around 200 to 300° C. breaks up into metallic tin and stannic sulfide ($SnS_2$). The metallic tin can be separated from the resulting mixture, and the residual stannic sulfide then heated to a temperature in excess of 300° C., whereupon the stannic sulfide is broken up into stannous sulfide and elemental sulphur. The elemental sulfur may be evolved as a vapor or may be separated otherwise from this mixture leaving a residue of stannous sulfide. The entire operation is then repeated and theoretically results in the isolation of one atom of metallic tin and one atom of elemental sulfur for each original one molecule of stannous sulfide. The condensed tin sulfur compound resulting from the practice of my invention can be subjected to this cycle of operations, in the same manner as stannous sulfide, for the isolation of metallic tin and elemental sulfur.

The condensed tin-sulfur compound may also be treated with steam at an elevated temperature whereby tin oxide is produced and hydrogen and hydrogen sulfide are liberated. These two gas components may then be further used in the process of sulfidizing more of the tin ore.

I claim:—

1. The method of forming volatile sulfur compounds of metals from metal bearing material, which comprises subjecting the metal bearing material at an elevated temperature and in the presence of a sulfur component to the action of a current of reducing gas in intimate contact with the metal bearing material particles and thereby forming and volatilizing a product containing the metal to be recovered, and withdrawing and condensing said volatile product.

2. The method of forming volatile sulfur compounds of metals from metal bearing material, which comprises subjecting the metal bearing material at an appropriate elevated temperature to the action of a current of gas of such reducing character and containing a sulfur component that there is thereby formed and volatilized a product containing the metal to be recovered, and withdrawing said volatile product and condensing the same.

3. The method of recovering metals capable of forming volatile products with sulfur from metal bearing material, which comprises subjecting the metal bearing material at an elevated temperature and in the presence of a sulfur component to the action of a gaseous medium of such reducing character that there is formed and volatilized a product containing the metal to be recovered combined with sulfur, and withdrawing and condensing said volatile product.

4. The method of recovering metals capable of forming volatile compounds with sulfur from metal bearing material, which comprises subjecting the metal bearing material at an appropriate elevated temperature to the action of a current of sulfur-containing gaseous medium and thereby forming and volatilizing a sulfur compound of the metal to be recovered, and withdrawing said volatile compound and condensing the same.

5. The method of recovering metals capable of forming volatile compounds with sulfur from metal bearing material, which comprises subjecting the metal bearing material at an appropriate elevated temperature to the action of a current of gaseous medium of such reducing character and containing a sulfur component that there is thereby formed and volatilized a sulfur compound of the metal to be recovered, and withdrawing and condensing said volatile compound.

6. The method of recovering metals capable of forming volatile compounds with sulfur from metal bearing material, which comprises subjecting the metal bearing material at an appropriate elevated temperature to the action of a current of reducing gas containing a sulfur component and thereby forming and volatilizing a sulfur compound of the metal to be recovered, the volume of said gas current being sufficient to sweep said volatile compound away from the material undergoing treatment, and withdrawing and condensing said volatile compound.

7. The method of recovering tin from tin-bearing material, which comprises subjecting the material at an elevated temperature and in the presence of a sulfur component to the action of a current of reducing gas and thereby forming and volatilizing a product containing tin, and withdrawing and condensing said volatile tin-containing product.

8. The method of recovering tin from tin-bearing material, which comprises subjecting the material at an elevated temperature and in the presence of a sulfur component to the action of a current of gaseous medium of such reducing character that there is formed and volatilized a product containing a compound of tin and sulfur, and withdrawing and condensing this resulting volatile product.

9. The method of recovering tin from tin-bearing material, which comprises subjecting the material at an appropriate elevated temperature to the action of a current of gas of such reducing character and containing a sulfur component that there is thereby formed and volatilized a product containing a compound of tin and sulfur, and withdrawing and condensing this resulting volatile product.

10. The method of recovering tin from tin-bearing material, which comprises subjecting the material at an appropriate elevated temperature to the action of a current of reducing gas containing a sulfur component and thereby forming and volatilizing a product containing a compound of tin and sulfur, the composition of said gas when in contact with the material to be such as to prevent the oxidation of the tin sulfur compound, the volume of said gas current being sufficient to sweep said volatile product away from the material undergoing treatment, and withdrawing and condensing said volatile product.

11. The method of recovering tin from tin-bearing material, which comprises subjecting the material at an elevated temperature to the action of a current of gas mixture of relatively low reducing power, said gas mixture containing a sulfur component, whereby a compound of tin and sulfur is formed and volatilized, and withdrawing and condensing said volatile compound.

12. The method of treatment of tin bearing material which comprises the step of heating the material under conditions whereby the material comes into contact with and is subjected to the action of a sulfur component and a current of reducing gas in such proportions and at such temperatures as to form a sulfur compound of tin.

13. The method of recovering tin and bismuth and molybdenum from their metal bearing material, which comprises subjecting the material at an elevated temperature and in the presence of a sulfur component to the action of a current of reducing gas and thereby forming and volatilizing a product containing the metal to be recovered, and withdrawing and condensing said volatile product.

14. The method of recovering tin and bismuth and molybdenum from metal bearing material, which comprises subjecting the material at an appropriate elevated temperature to the action of a current of gas of generally reducing character and containing a sulfur component and thereby forming and volatilizing a product containing the metal to be recovered, and withdrawing said volatile product and condensing the same.

15. The method of recovering tin and bismuth and molybdenum from metal bearing material, which comprises subjecting the material at an elevated temperature and in the presence of a sulfur component to the action of a current of gas of such reducing character that there is thereby formed and volatilized a product containing the metal to be recovered combined with sulfur, and withdrawing and condensing said volatile product.

16. The method of recovering tin and bismuth and molybdenum from metal bearing material, which comprises subjecting the material at an appropriate elevated temperature to the action of a current of sulfur-containing gaseous medium and thereby forming and volatilizing a sulfur compound of the metal to be recovered, and withdrawing said volatile compound and condensing the same.

17. The method of recovering tin and bismuth and molybdenum from metal bearing material, which comprises subjecting the material at an appropriate elevated temperature to the action of a current of gas of such reducing character that there is containing a sulfur component and thereby formed and volatilized a sulfur compound of the metal to be recovered, and withdrawing and condensing said volatile compound.

18. The method of recovering tin and bismuth and molybdenum from metal bearing material, which comprises subjecting the material at an appropriate elevated temperature to the action of a current of reducing gas containing a sulfur component and thereby forming and volatilizing a sulfur-compound of the metal to be recovered, the volume of said gas current being sufficient to sweep the volatile compound away from the material undergoing treatment, and withdrawing and condensing said volatile compound.

In testimony whereof I affix my signature.

CHARLES LALOR BURDICK.